United States Patent [19]

Fenwick

[11] 4,321,939

[45] Mar. 30, 1982

[54] MULTI-LIQUID FLOW PROPORTIONING DEVICE

[76] Inventor: Harry T. Fenwick, 103 Argyll St., Coffs Harbour, New South Wales, Australia, 2450

[21] Appl. No.: 203,671

[22] Filed: Nov. 3, 1980

[30] Foreign Application Priority Data

Nov. 2, 1979 [AU] Australia ............................ PE1173

[51] Int. Cl.³ ............................................ G05D 11/03
[52] U.S. Cl. ................................. 137/101.27; 137/87; 137/88; 137/114; 222/57
[58] Field of Search ............... 137/87, 88, 98, 101.25, 137/101.27, 264, 409, 440, 447, 574, 575, 114; 222/56, 57, 129

[56] References Cited

U.S. PATENT DOCUMENTS

| | | | |
|---|---|---|---|
| 767,698 | 8/1904 | Kennicott | 137/101.27 |
| 4,103,358 | 7/1978 | Gacki et al. | 137/101.27 |
| 4,193,515 | 3/1980 | Purdy | 222/57 |

FOREIGN PATENT DOCUMENTS 1573015  9/1970  Fed. Rep. of Germany ........ 222/57

*Primary Examiner*—H. Jay Spiegel
*Attorney, Agent, or Firm*—Cushman, Darby & Cushman

[57] ABSTRACT

This invention concerns a multi-liquid flow proportioning device comprising a vessel adapted to contain a first liquid, a container within said vessel adapted to hold a second liquid separate from said first liquid, separate inlet and outlet means respectively for the portion of said vessel adapted to contain said first liquid and for said container, said container including a wall portion adapted to move in use in resopnse to changes in pressure of its liquid contents, and means operable by the movement of said wall portion to control the liquid flow into the inlet of said container whereby tending to maintain the volumetric contents thereof generally constant. The invention has particular application to combining water and fire retardant.

9 Claims, 8 Drawing Figures

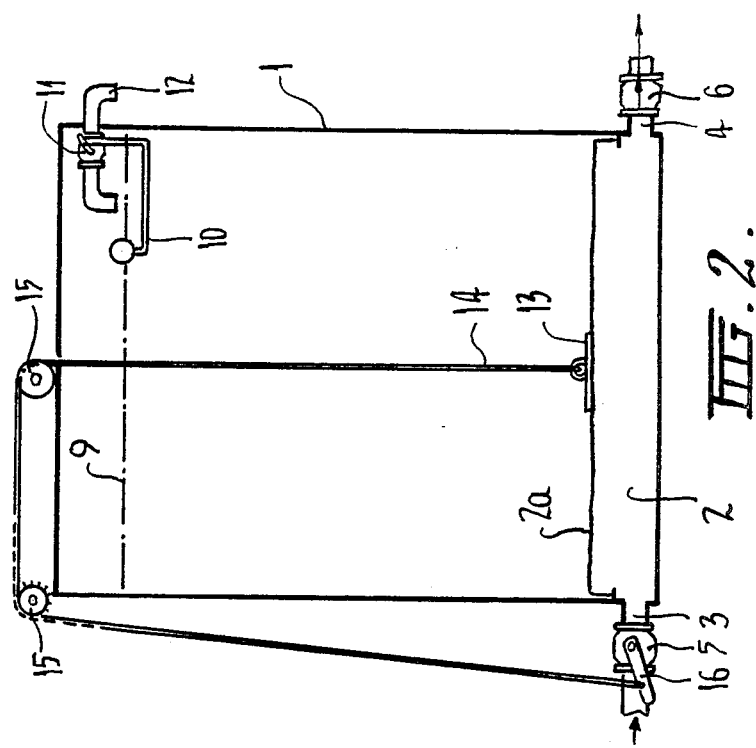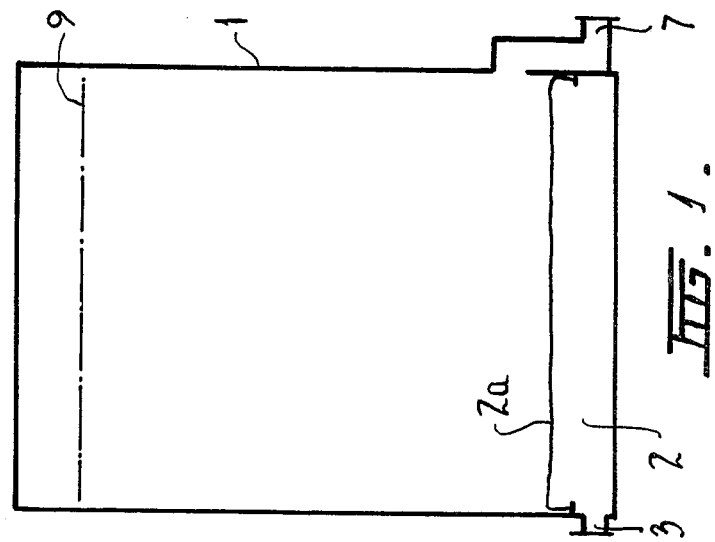

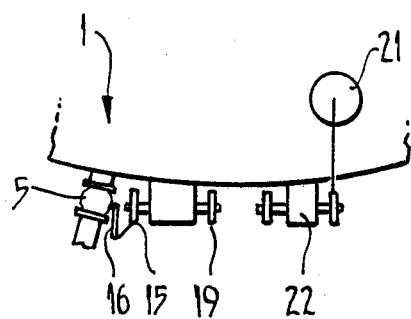
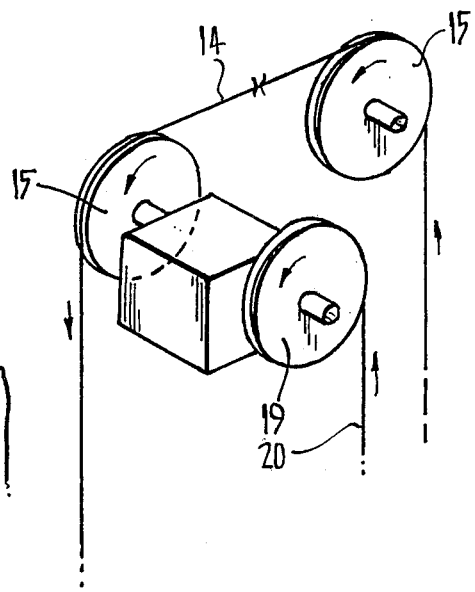
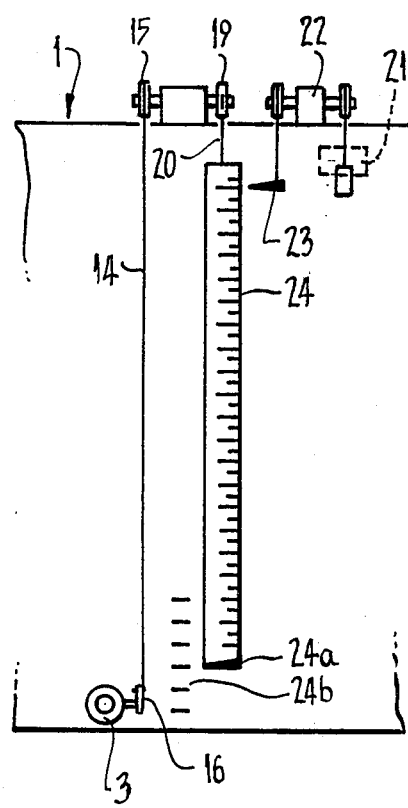

MULTI-LIQUID FLOW PROPORTIONING DEVICE

FIELD OF THE INVENTION

This invention relates to a composite vessel designed to achieve a continuous discharge from two or more compartments of the vessel in a predetermined volumetric ratio irrespective of the volume in any one of the separate compartments.

DESCRIPTION OF THE PRIOR ART

It has been known to construct liquid proportioners comprising a separate container for each liquid, each container having its own metering device interlocked with one another either mechanically or electrically in order to produce a combined flow in a constant ratio. Such metering devices include coupled pumps, pressure compensated valves, orifices, flow meters and similar liquid measuring equipment, all of which are costly and subject to wear and malfunction, and constantly require substantial maintenance: additionally, there is a problem with continuity of supply where electrical components are involved.

SUMMARY OF THE INVENTION

In accordance with the present invention, a liquid proportioning device comprises a vessel adapted to contain a first liquid, a container within said vessel adapted to hold a second liquid separate from said first liquid, separate inlet and outlet means respectively for the portion of said vessel adapted to contain said first liquid and for said container, said container including a wall portion adapted to move in use in response to changes in pressure of its liquid contents, and means operable by the movement of said wall portion to control the liquid flow into the inlet of said container whereby tending to maintain the volumetric contents thereof generally constant.

The container may comprise flexible diaphragm means sealingly attached to side wall portions of said vessel, whereby said container is defined by portions of said vessel's side walls, the base surface thereof, and said flexible diaphragm means which constitute the moveable wall portion of said container. Alternatively, the container(s) may be of separate construction to the vessel and may be in the form of a bladder or a thin walled flexible tube or a plurality thereof on the floor of the vessel, of any shape or size. An important object is to have all outlets at the same level to ensure all outlet pressures are equal to the outlet pressure from the portion of the vessel holding the first liquid.

The holding portion of the composite vessel (hereinafter called the "holding vessel") may be open at the top either completely or through atmospheric vents or alternatively, closed and subject to superimposed pressure. The inlet may be located at any convenient point on the vessel. The outlet will be located at or near the bottom, preferably fitted with a valve or other closure means.

The flexible containers (which may be in the form of bladders) may be of sheet plastic, rubber, coated fabric, metal foil, or a combination of such materials. Being subject to neither external or internal pressure, their construction may be light weight but they must be sufficiently impermeable as to maintain their contents separate from that in the holding vessel. Each container will have an inlet, preferably passing through a sealed opening in the side of the holding vessel, with each inlet fitted with a flow control valve or similar device.

The sizing of the holding vessel and container will be influenced by the volumes and flow rates of the liquids being handled.

When liquids of differing specific gravities are involved, the working level of respective containers will preferably be kept to a minimum relative to the working head in the holding vessel in order to minimise head difference due to specific gravity variation.

In the event of the specific gravity difference being of such magnitude as to prevent the maintenance of flow ratios within working limits, corrections may be made to any container so affected, for example by adding or subtracting lift to or from the upper wall of the container, as follows, for example. In the event of the contents of a container having a higher specific gravity than the contents of the holding vessel, then the container may have affixed to its upper surface, a floatation layer, preferably of rigid material such as polystyrene, urea formaldehyde, polyurethane or similar foamed plastic suitably sheathed or treated to prevent absorption of liquid.

In the event of the liquid in a container having a lower specific gravity than that of the liquid of the holding vessel, the upper surface of such container may have affixed thereto a layer of heavier material such as metal.

The containers will each have their own source of liquid supply through a simple valve, the opening and closing of which will be effected by mechanical or electrical relays governed by the movement of the upper wall thereof. In the simplest form this may be arranged by connecting a flexible rope or cable to the upper surface of the containers and passing it over a series of pulleys fixed above the holding vessel. The rope or cable then passes down to a dead weight or spring controlled lever valve on the inlet to the container so that as the container fills, its upper wall rises and the lever lowers to close off the valve. As liquid leaves the container, its upper wall falls, thus pulling the rope or cable to lift the lever and hence open the valve. Such regulation will result in the contents of all containers being maintained at, or about the desired working level.

Because the outlets of holding vessel and containers are all at the same invert level, it follows that the upstream pressure on each outlet will be equal (within determinable limits). By adjusting the orifice at each outlet, it will be possible to produce a flow from each in any desired ratio to the others. As the upstream head over all outlets is directly related to the liquid level in the holding vessel, it follows that the flow from each outlet will remain in the set ratio for all levels in the holding vessel. Pressure or flow sensitive valves may be fitted on some or all outlets to prevent backflow and mixing of liquids under no-flow conditions. Such valves may also be used to select which liquids or combination thereof will contribute to the required flow.

BRIEF DESCRIPTION OF THE SEVERAL VIEWS OF THE DRAWINGS

A better understanding of the invention will be gained by consideration of the accompanying drawings in which:

FIG. 1 illustrates a general view of the device of the invention;

FIG. 2 is a similar view to that of FIG. 1 but rotated, and including ancilliary equipment;

FIGS. 4A, 4B, 4C show details of a feed back system between the upper wall of a container and the inlet thereto;

DETAILED DESCRIPTION OF THE PREFERRED EMBODIMENTS

Figures 3A, 3B:
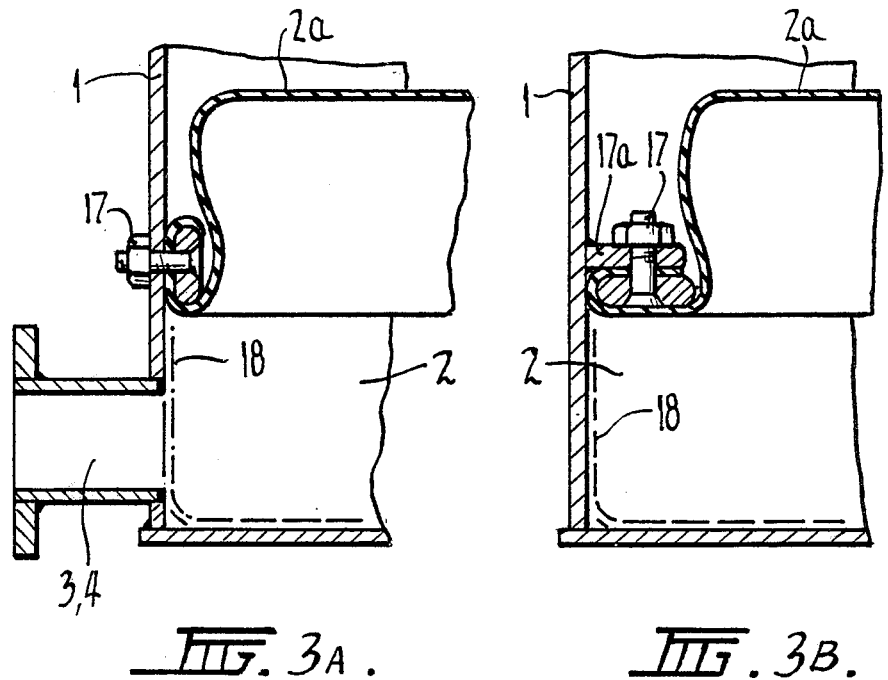
FIGS. 3A and 3B show details of alternative arrangements of securing the upper wall of a container within the holding tank.

A composite vessel 1, in accordance with the invention comprises a holding portion (holding vessel as stated hereinbefore) and a flexible container 2. Note that it is not necessary for all the walls of the container to be flexible in order that the container itself be categorized as flexible. In the illustrations (FIGS. 1 and 2), the upper wall thereof 2a is the only flexible section.

The inlet to container 2 is shown at 3, and the outlet 4 is visible in the rotated position of the composite vessel shown in FIG. 2. Valve 5 controls flow to inlet 3 and valve 6 controls the flow from outlet 4. The flow from the holding vessel is via outlet 7 controlled by valve 8.

Level 9 is the liquid level maintained in the holding vessel. This level is controlled by float 10 (FIG. 2) operating valve 11 which controls flow into inlet 12. A reinforcing portion 13 on flexible wall 2a is attached to a cable, chain or the like 14, and passes over pulleys 15 to lever 16 (dead weight or spring operated) which controls valve 5, and hence the inlet flow to the container. This is shown generally in FIG. 2 and in more detail in FIGS. 4a, 4b, 4c. However, before passing to FIGS. 4, it should be noted that the flexible wall of the container may be affixed directly to the walls of the composite vessel as shown by way of example in FIGS. 3a and 3b. Wall 2a can be fixed directly to the wall by means of nut and bolt 17, or the like; alternatively it could be attached to flange 17a extending about the walls of the vessel. Item 18 is a protective reinforcement for the flexible wall to extend over the inlet and/or outlet. Item 18 can be in the form of a perforated plate (over the inlet/outlet) or in the form of an extended reinforcement of the diaphragm itself. The purpose of the container being expandable is to ensure that the pressure within it is always the same as the contents of the holding vessel outside the container (i.e. of said first liquid) — the pressure being measured at the outlets. The control of volume in the container is to ensure that it can meet the maximum draw-off requirements and at the same time not overfill so as to damage the flexible moveable walls of the container.

Turning now to FIGS. 4, pulley 19 shafted to rotate with pulley 15 carries cable or the like 20 which in turn carries water gauge 24, and pointer 24a, indicating against the liquid container gauge 24b. A second pulley arrangement 22 supports in balance pointer 23 (which indicates against gauge 24) and float 21, whereby when the liquid supporting the float rises, pointer 23 falls.

Figure 5:
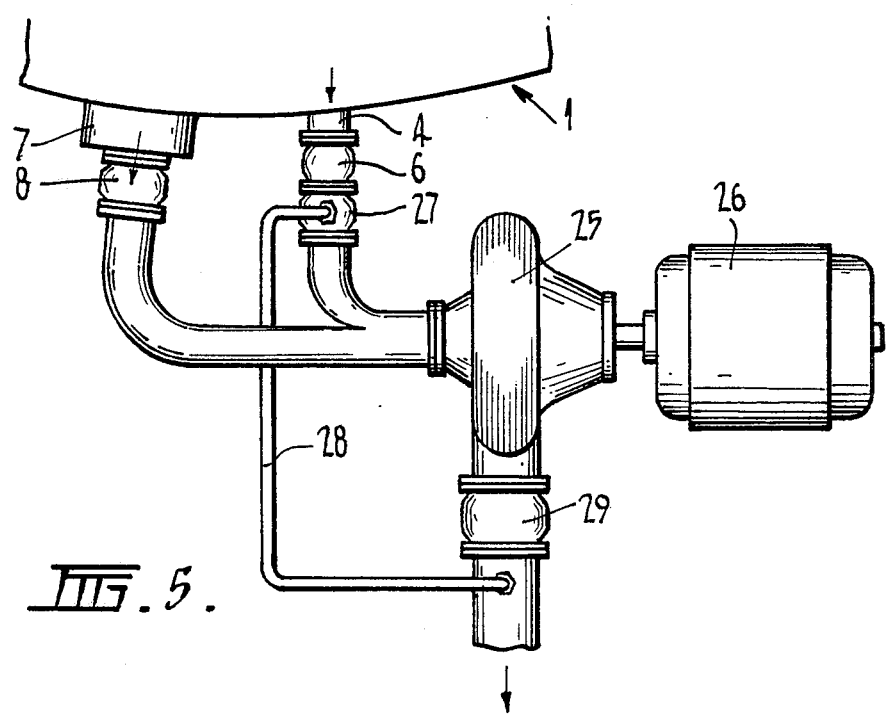
FIG. 5 shows the outlet valve arrangement from the device of the invention.

FIG. 5 illustrates the outlet and mixing arrangement from the flexible container and the holding vessel. Electric motor 26 operates pumps 25 to mix liquids from outlets 4 and 7 and discharge them through valve 29. A second automatic valve 27 is in the container outlet line. This is a diaphragm type valve (i.e. it requires pressure to open it) and automatically closes when the pump stops or discharge valve 29 is closed, to prevent any feed back of the main liquid into the container of vice versa. Note that pilot line 28 connects valve 27 to the discharge side of valve 29 whereby to provide sensing of the discharge flow or pressure, for operation of valve 27.

The device of the invention has a multitude of uses e.g:
  (i) in water treatment plant, where additions of small quantities of liquid containing fluorine, and/or chlorine ions, and deodorizers are made to the bulk raw water supply;
  (ii) in swimming pools, where chlorine and various other bacteriocides are added to the supply;
  (iii) in sewerage systems treatment works;
  (iv) in general chemical engineering and process work;
  (v) for the combining of fire retardant and water in a truck mounted tank for bush fire and fire control generally;
  (vi) for the mixing in desired proportions of foam agents and water to produce high and low expansion foams for fire fighting.

It is to be understood that the above described device is exemplary only and that the various components thereof can be substituted by equivalent components or differently constructed in ways well known to those skilled in the art. For example, and in particular, the sensor 28 (FIG. 5) and gauge arrangements (FIG. 4a) can be substituted by the equivalent electrical devices, similarly the cable/lever arrangement for operating the inlet valve to the container could also be substituted by the equivalent electrical means. It should be noted also that while only one container has been described within the vessel 1, there can be a plurality of such containers whereby the controlled mixed and flow of various liquids can be arranged.

It is to be understood that the invention resides in the various apparatus described and claimed and their mechanical equivalents and is not to be restricted by reference to theory.

I claim:

1. A liquid flow proportioning device comprising a vessel for containing a first liquid, a container within said vessel for holding a second liquid separate from said first liquid, separate inlet and outlet means respectively for the portion of said vessel for containing said first liquid and for said container, said container including a flexible wall portion which moves in use in response to changes in pressure of its liquid contents and changes in level of said first liquid, said flexible wall portion being sealingly attached to side wall portions of said vessel, whereby said container is defined by portions of said vessel's side walls, the base surface thereof, and said flexible wall portion, and means operable by the movement flexible of said wall portion to control the liquid flow into the inlet of said container whereby tending to maintain the volumetric contents thereof generally constant.

2. A liquid flow proportioning device as defined in claim 1, wherein said flexible wall portion is comprised of a diaphragm.

3. A liquid flow proportioning device as defined in claim 1, wherein the inlet to said first liquid portion of said vessel includes float controlled valve means, whereby in use, to define the level of said first liquid.

4. A liquid flow proportioning device as defined in claim 1, wherein said means operable by the movement of said flexible wall portion comprises signalling means attached to said wall portion and connected to valve operating means on a valve at the inlet to said container whereby to operate said valve.

5. A liquid flow proportioning device as defined in claim 4, wherein said signalling means comprises cable means extending around pulley means.

6. A liquid flow proportioning device as defined in claim 4, wherein said valve operating means is a dead weight connected to operate said valve.

7. A liquid flow proportioning device as defined in claim 4, wherein said valve operating means is a spring biased lever connected to operate said valve.

8. A liquid flow proportioning device as defined in claim 1, wherein the outlet from said first liquid portion of said vessel and the outlet from said container pass to a common line, and there is a valve in the container outlet line which prevents flow into said container of said first liquid.

9. A liquid flow proportioning device as defined in claim 8, wherein said common line passes to a motor driven pump, and thence through a valve to a discharge line.

* * * * *